Nov. 20, 1951

O. W. LOUDENSLAGER 2,575,761

LOCKING DEVICE FOR CASTERED AIRPLANE
MAIN LANDING WHEELS

Filed March 11, 1948

INVENTOR.
Oscar W. Loudenslager
BY
*A. H. Oldham*
ATTORNEY

Nov. 20, 1951 O. W. LOUDENSLAGER 2,575,761
LOCKING DEVICE FOR CASTERED AIRPLANE
MAIN LANDING WHEELS
Filed March 11, 1948 2 SHEETS—SHEET 2

INVENTOR.
Oscar W. Loudenslager
BY
A.H. Oldham
ATTORNEY

Patented Nov. 20, 1951

2,575,761

UNITED STATES PATENT OFFICE 2,575,761

LOCKING DEVICE FOR CASTERED AIRPLANE MAIN LANDING WHEELS

Oscar W. Loudenslager, Akron, Ohio, assignor to Goodyear Aircraft Corporation, Akron, Ohio, a corporation of Delaware Application March 11, 1948, Serial No. 14,378

1 Claim. (Cl. 244—103)

This invention relates to the improvement of the Cross-Wind Airplane Landing Gear, Serial No. 741,198, filed April 14, 1947, now U. S. Patent No. 2,504,077, issued April 11, 1950, in which the wheels caster only within a limited angle, and, in particular, to a locking device to prevent castering these wheels when an airplane is moved backward.

Heretofore, it has been known to provide airplane tail wheels, usually castering 360°, with arresting or locking devices. These, however, were of a more complicated construction and did not lock the wheels automatically.

It is the general object of the invention to overcome the foregoing and other difficulties by providing castering airplane main landing wheels having only limited caster angles with automatic means permitting castering of the wheels at higher speed and locking them at low speed, for instance, when the airplane is moved backward to be parked within a restricted space.

Another object of the invention is to achieve automatic locking of castering airplane main landing wheels in the simplest and cheapest possible way.

The aforesaid objects of the invention and other objects, which will become apparent as the description proceeds, are achieved by providing the stabilizing or centering cam of the wheel with a notch at the lowest portion of the cam surface on which rides the cam follower. This notch is so designed and dimensioned that the cam follower will not be unseated from the notch when the airplane on the ground moves at low speed, particularly in backward direction, for instance, for the purpose, of parking the airplane within a limited space as in a hangar, but which will permit castering of the wheels at higher speed when taxiing and in landing.

For a better understanding of the invention reference should be had to the accompanying drawing, wherein.

Figure 2:
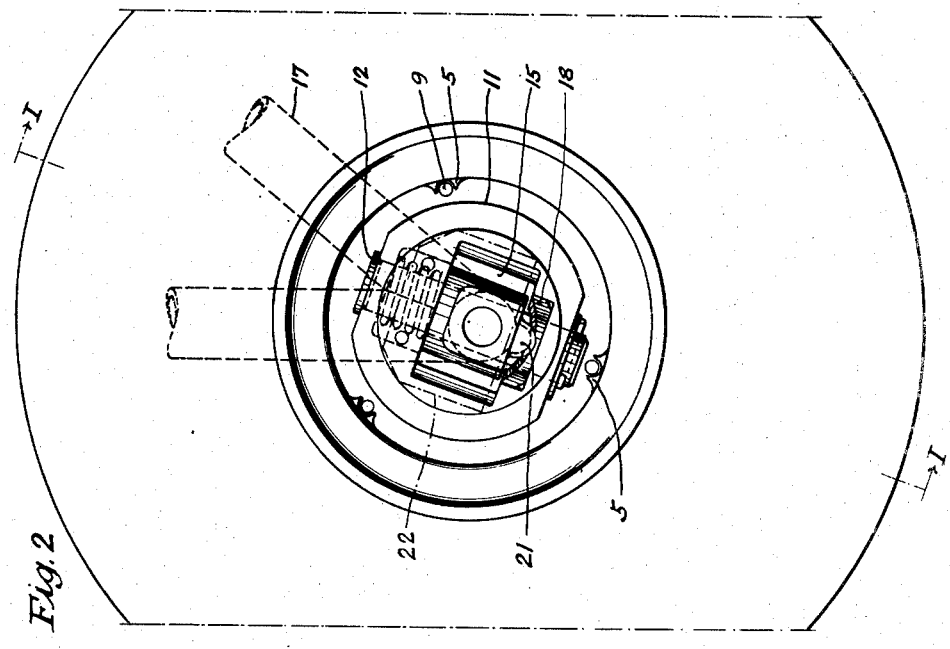
Fig. 2 is a fragmentary outside side view of Fig. 1 shown with the bearings and outer bearing ring removed.
Figure 1:
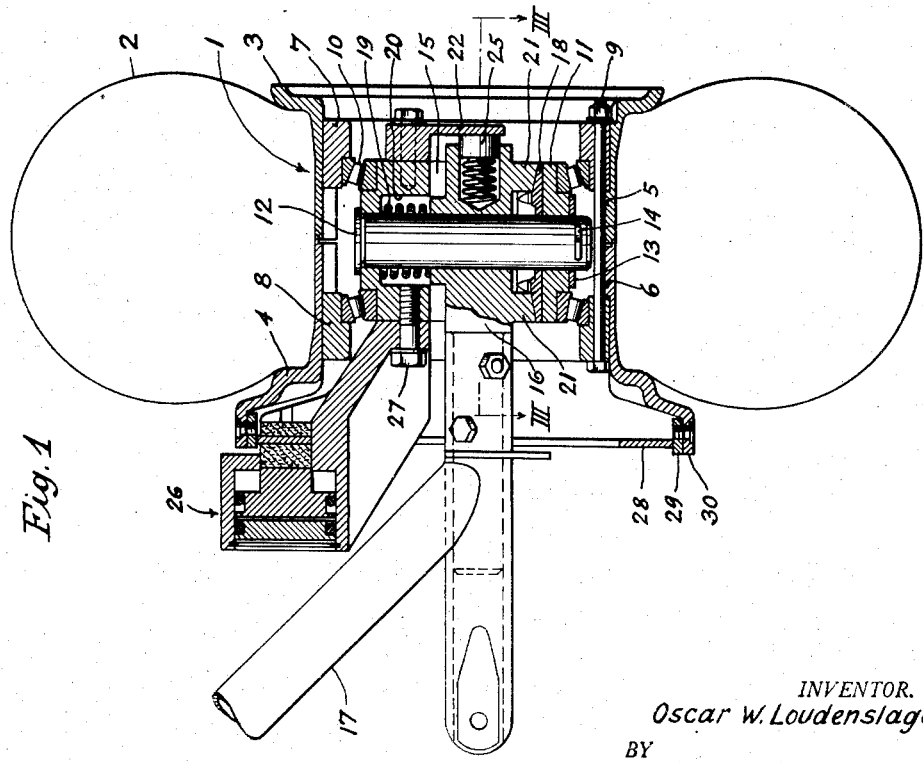
Fig. 1 is a cross sectional view of a castered main landing wheel, according to the invention, taken on line I—I of Fig. 2.

Although the principles of the invention have been found particularly applicable for light airplanes, there is no apparent limit to their application for land airplanes in general.

With specific reference to the drawings, the numeral 1 indicates, in general, a castered main wheel for an airplane consisting of a rubber tire 2 inserted between the rim parts 3 and 4 having a number of spacers 5 and 6, respectively, distributed over the circumference, against which the outer bearing supports 7 and 8 are clamped by bolts 9. Roller bearings 10 inserted with their outer races into the bearing supports 7 and 8 have fitted between and within their inside races a non-rotatable hub 11 which carries a king pin 12 passing through the center thereof and being secured thereto by a washer 13 and a cotter pin 14. Through a transverse opening 15 in the king pin support 11 passes, spaced from the inner side walls thereof, the wheel stub axle 16 attached to the airplane landing frame 17, and in the outer end of which the king pin 12 pivots allowing the wheel to caster about 25 degrees to either side from its center position, i. e., a vertical plane parallel to the longitudinal axis of the airplane.

Into the bottom portion of the opening 15 is fitted a circular cam 18 (shown enlarged, Figs. 4 to 6), having sharper contoured diametrically opposite notches 31 at the bottom of its upwardly-directed, flatly-notched active surfaces 32 and being concentric to the king pin 12. The cam 18 held under pressure of the spring 19 in the recess 20, cooperates with a set of oppositely arranged cam followers 21 extending from the underside of the stub axle 16 to return the wheel from a castered position to zero or normal position. The sharper notches 31, in which are seated the cam followers 21, prevent the wheel from castering at low speed in backward movement, but will permit it at higher speed in forward movement for taxiing and landing purposes. Therefore, when moving the airplane backward as, for instance, for parking it within a restricted area, as in a hangar, the wheels are always kept in straight or zero position, because at such low speed a side force will not cause the cam followers 21 to be unseated from the notches 31.

Figure 7:
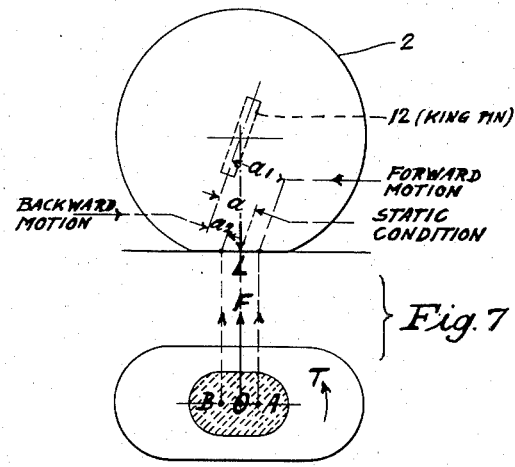
Fig. 7 is a diagrammatic view of the castering wheel for explaining the functioning of the invention.

Furthermore, as indicated in Fig. 7, the vertical load L on the wheel will shift somewhat from below the wheel center O backward to A in forward travel, and forward to B in backward travel, thereby increasing and decreasing, respectively, the momentum leverage (a) of a side force F to $a1$ and $a2$, respectively, relative to the king pin. Thus, the greater torque momentum T for castering the wheel in forward travel at usually higher speed will always be capable of castering the wheel whereas in backward travel at the usual low speed and due to the reduced leverage $a2$, it cannot unseat the cam followers 21 from the notches 31 and, thus, makes this arrangement a workable automatic device for locking the wheels against castering for such purpose. That was successfully proved by many tests made.

Figure 8:
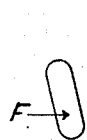
Figs. 8 and 9 show possible positions of the wheels in backward motion when without the provision of the locking device.
Figure 9:
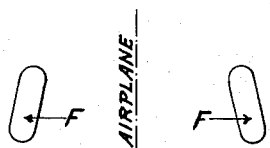

Figs. 8 and 9 show the landing wheels in in-toed and out-toed position, respectively, which they might assume with a negative caster and which would interfere with proper ground handling of the airplane.

As seen in Fig. 2 the king pin 12 is positioned at an angle to the vertical so that even with a raised tail end of an airplane the intersection of the king pin axis with the ground is always forward of the wheel ground contact to provide in forward motion at sufficient speed positive caster action of the wheel. In castering the wheel the cam followers sweeping over the cam will tend to lift the airplane about the same amount as the loss of wheel height due to the change of the vertical position of the wheel into a leaning position (because of the angle of king pin with the vertical), thus keeping the plane always at the substantially same height. It is to be noted that when the airplane is on the ground the cam 18 and cam followers 21 are held together by the weight of the airplane.

Figure 3:
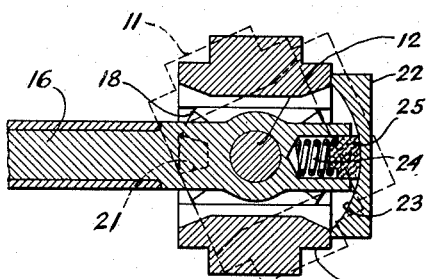
Fig. 3 is a fragmentary horizontal cross-sectional view of the wheel axle taken on line III—III of Fig. 1.
Figure 4:
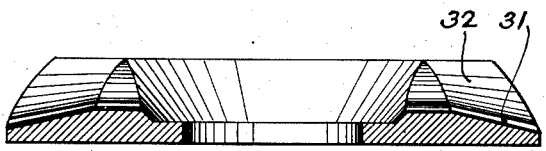
Fig. 4 is a cross-sectional view taken on line IV—IV of Fig. 5 of a cam inserted at the bottom of the king pin support.
Figure 6:
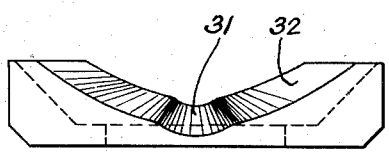
Fig. 6 is a cam end view.
Figure 5:
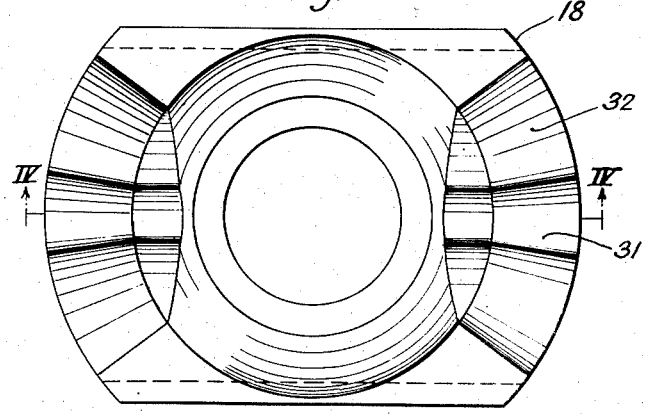
Fig. 5 is a top plan view of Fig. 4.

In Fig. 3 are shown by dash lines the extreme angular positions of the wheel to which it can swing out in both directions, that is, until the inner broken edges of the king pin support 11 will touch the stub axle 16. The cam 18 shown by itself in Figs. 4, 5 and 6 is rather low to enable the wheel at sufficient speed to overcome the locking effect of the cam notch 31 and to caster in either direction with little effort which makes castering a smooth operation to avoid jerks and reduce shimmying. Also, because of the symmetrical shape of the cam, it will readily bring back the wheel, when off the ground, to its zero position, that is parallel to the longitudinal axis of the airplane.

In order to dampen smaller lateral wheel motions or secondary vibrations due to uneven ground a friction element 22 is provided, having at its inner side a cylindrical surface 23 equidistant to the king pin axis against which is pressed, by a spring 24, a preferably cylindrical friction block 25.

A standard spot disk brake, indicated as a whole at 26, is attached by bolts 27 to the inner side of the king pin support 11 to cooperate with the brake disk 28 held by keys 29 fastened to the brake flange 30 integral with the wheel rim 4. A brake of this type is especially suitable, as in this case, the available space is limited.

In operating this type of landing gear it has been found that a castering angle of 25 degrees in either direction from the zero position of the wheel, i. e., a vertical plane parallel to the longitudinal axis of the airplane, is ample to safely land and to take-off an airplane in a 90 degree side wind of about 30 miles an hour. This angle, however, may be varied somewhat for different type of airplanes; and, also, the angle of about 21 degrees between the king pin axis and the vertical which was found suitable may be increased or decreased in specific installations.

It will be recognized that the objects of the invention have been achieved by an extremely simple structural change of the original construction by automatically locking castering of the wheels at low speed, as, for instance, for parking, but let them caster freely at higher speed for taxiing and landing maneuvers.

While in accordance with the patent statutes one best known embodiment of the invention has been illustrated and described in detail, it is to be particularly understood that the invention is not limited thereto or thereby, but that the inventive scope is defined in the appended claim.

I claim:

A cross-wind main landing gear for an airplane including a horizontal transverse axle, a king pin pivotally and slidably positioned in each end of the axle in vertical planes parallel to the longitudinal airplane axis and at an angle with the vertical, a hollow hub fixedly mounted on each king pin and being radially spaced from the axle for allowing the hub castering movement to about 25° on each side of the aforesaid vertical planes, a spring inserted between hub and axle for resilient movement of the axle with respect to the king pin, a wheel rotatably mounted on the hub, a flat low cam seated on the hub concentrically to the king pin, said cam having a pair of symmetrically arranged annular upwardly-facing friction surfaces of concavely-curved contours extending over the 25° castering movement and including a low-depth radial notch at the bottom of each friction surface and having a cross-sectional curvature somewhat sharper than the curvature of said concave surface, and a pair of fixed cam followers extending downwardly from each end of the axle in frictional engagement with and transmitting the full load of the airplane upon the cam when the airplane is on the ground, thereby urging the cam notch from a castered position into alignment with the cam followers and prevent the wheels from castering at parking speed, but permit castering at greater than parking speed.

OSCAR W. LOUDENSLAGER.

REFERENCES CITED

The following references are of record in the file of this patent:

UNITED STATES PATENTS

| Number | Name | Date |
|---|---|---|
| 1,896,234 | Hathorn | Feb. 7, 1933 |
| 2,326,019 | Dowty | Aug. 3, 1943 |

FOREIGN PATENTS

| Number | Country | Date |
|---|---|---|
| 542,648 | Great Britain | Jan. 21, 1942 |